(12) United States Patent
James

(10) Patent No.: US 7,300,238 B1
(45) Date of Patent: Nov. 27, 2007

(54) MULTI-FUNCTION WINCH FOR INTERCHANGEABLY ATTACHING TO BOTH THE FRONT AND THE BACK OF AN ALL-TERRAIN VEHICLE

(76) Inventor: Scott James, 351 Dutchman Creek Rd., Buffalo, SC (US) 29321

( * ) Notice: Subject to any disclaimer, the term of this patent is extended or adjusted under 35 U.S.C. 154(b) by 275 days.

(21) Appl. No.: 11/068,214

(22) Filed: Feb. 28, 2005

(51) Int. Cl.
*B60P 1/00* (2006.01)
(52) U.S. Cl. ...................................... 414/540; 414/543
(58) Field of Classification Search ................ 414/541, 414/542, 543, 462, 540; 280/401, 639
See application file for complete search history.

(56) References Cited

U.S. PATENT DOCUMENTS

| | | | |
|---|---|---|---|
| 5,236,062 A | 8/1993 | Laney | |
| 5,393,194 A | 2/1995 | Smith | |
| 5,662,451 A | 9/1997 | Muzzi et al. | |
| 5,788,095 A * | 8/1998 | Watson | 212/180 |
| 5,975,831 A | 11/1999 | Martin | |
| 6,089,431 A * | 7/2000 | Heyworth | 224/521 |
| 6,105,721 A * | 8/2000 | Haynes | 182/127 |
| 6,138,991 A | 10/2000 | Myers, Jr. | |
| 6,155,771 A | 12/2000 | Montz | |
| 6,382,484 B1 * | 5/2002 | Savant | 224/401 |
| 6,461,095 B1 * | 10/2002 | Puska | 414/462 |
| 6,732,892 B1 * | 5/2004 | Mangrum | 224/401 |
| 2002/0048504 A1 * | 4/2002 | Jacobs | 414/541 |
| 2004/0031617 A1 * | 2/2004 | Skarlupka et al. | 173/184 |

* cited by examiner

*Primary Examiner*—Charles A Fox
(74) *Attorney, Agent, or Firm*—Richard L. Miller

(57) ABSTRACT

A multi-function winch for interchangeably attaching to either the front of an ATV or the back of the ATV. The multi-function winch includes a front mounting assembly, a back mounting assembly, a column assembly, an elbow assembly, and a winch assembly. The front mounting assembly attaches to the front cargo rack of the ATV. The back mounting assembly attaches to the back cargo rack of the ATV and to the trailer hitch of the ATV. The column assembly is interchangeably attached to either the front mounting assembly or to the back mounting assembly. The elbow assembly is interchangeably attached to the front mounting assembly. The winch assembly is interchangeably attached to either the rear mounting assembly, the column assembly, or the elbow assembly.

52 Claims, 4 Drawing Sheets

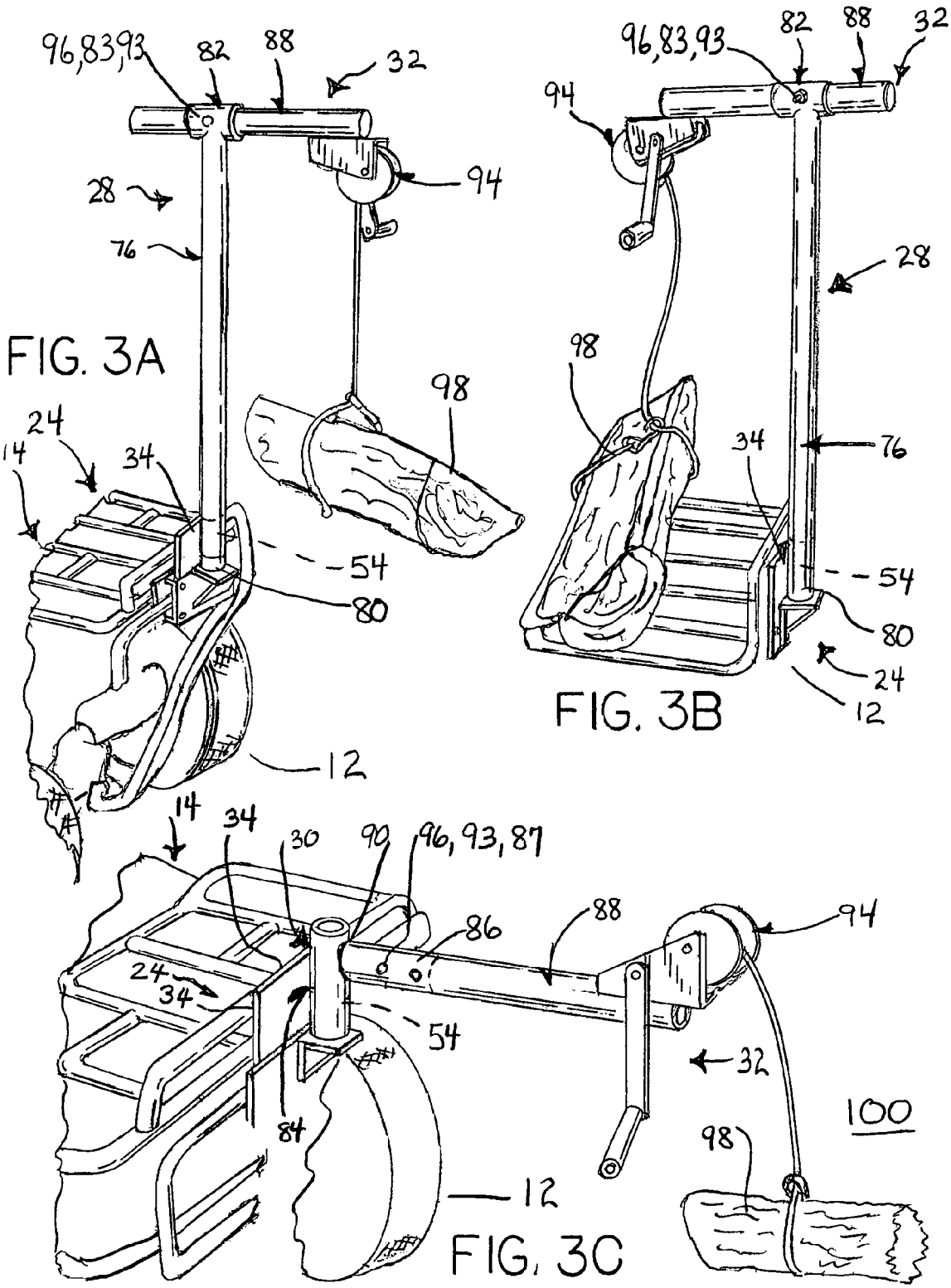

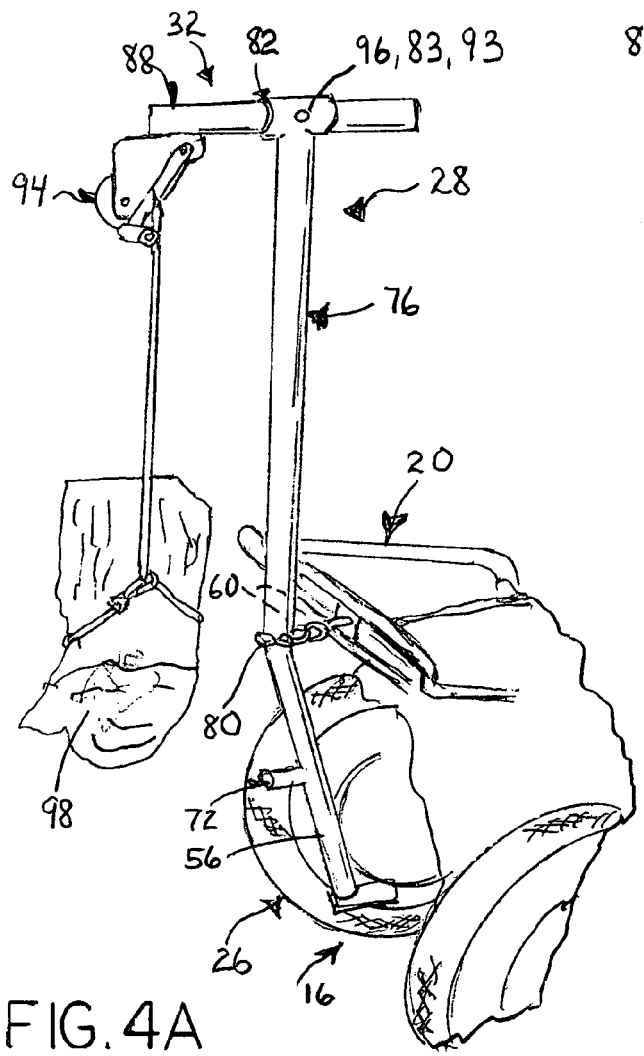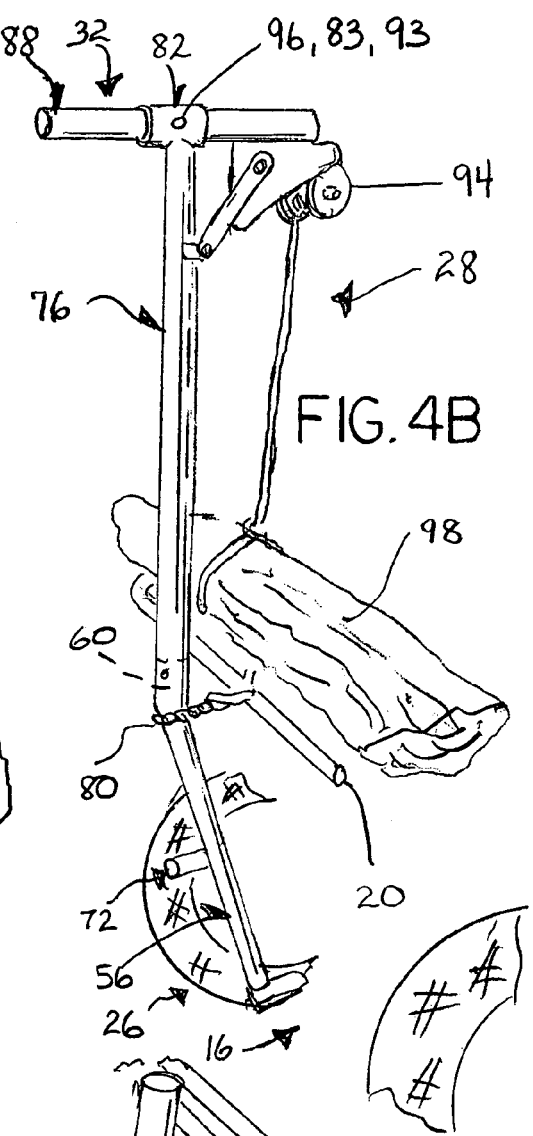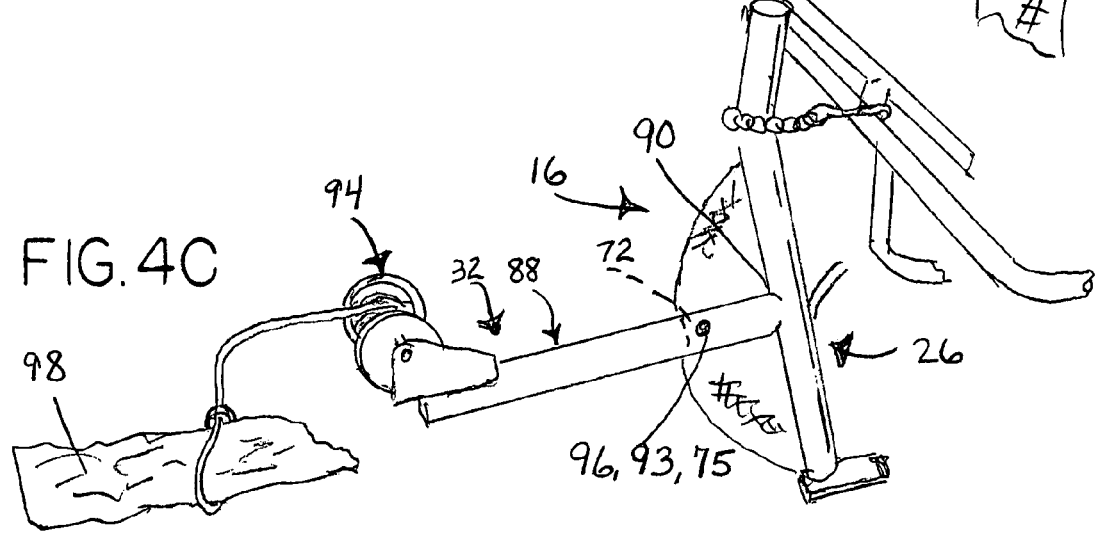
FIG. 4A
FIG. 4B
FIG. 4C

MULTI-FUNCTION WINCH FOR INTERCHANGEABLY ATTACHING TO BOTH THE FRONT AND THE BACK OF AN ALL-TERRAIN VEHICLE

BACKGROUND OF THE INVENTION

1. Field of the Invention

The present invention relates to a winch, and more particularly, the present invention relates to a multi-function winch for interchangeably attaching to both the front and the back of an all-terrain vehicle which are commonly referred to by the acronym ATV.

2. Description of the Prior Art

Numerous innovations for ATV attachments have been provided in the prior art that will be described. Even though these innovations may be suitable for the specific individual purposes to which they address, however, they differ from the present invention.

A FIRST EXAMPLE, U.S. Pat. No. 5,236,062 to Laney teaches a support rack arranged for mounting to an all-terrain vehicle framework that is formed with a first frame assembly in confronting relationship to a second frame assembly defining a gap therebetween to receive various components for transport. The frame assembly includes a rectilinear framework to include fully projecting legs to receive projecting legs of the second frame assembly in an adjustable relationship. A modification of the invention includes the first frame assembly mounting a ladder structure thereto in a pivotal relationship for use in hunting situations when transporting components such as tree stands permitting ease of ascent of an associated tree utilizing the ladder arrangement.

A SECOND EXAMPLE, U.S. Pat. No. 5,393,194 to Smith teaches a game-handling apparatus which is mounted on a four-wheel all-terrain vehicle having a winch fixed to the vehicle with a winch line wound on a winch drum in the winch, the game-handling apparatus including a first roller mounted on the front of the vehicle above the winch for guiding the winch line from the winch upwardly, a roll bar pivotally secured to the vehicle and fitted with a middle pulley for guiding the winch line rearwardly and a rear roller attached to the rear of the vehicle for guiding the winch line downwardly behind the vehicle. A sling is attached to the end of the winch line and the sling is secured around a game animal such as a deer, after which, the winch is operated to wind the winch line on the winch drum and lift the deer into field-dressing configuration or onto the all-terrain vehicle for transportation.

A THIRD EXAMPLE, U.S. Pat. No. 5,662,451 to Muzzi et al. teaches a hoist for lifting or hanging game animals. The hoist is particularly adapted for attachment to an ATV. The hoist includes a horizontal boom attached to a vertical support shaft. The vertical support shaft is telescoping to allow the height of the boom to be varied. The hoist is attached to the ATV by a base which allows the hoist to be supported in a vertical position for lifting game, and in a horizontal position for travelling. A bracing leg is also provided to prevent the ATV from tipping when heavy weights are being lifted using the hoist.

A FOURTH EXAMPLE, U.S. Pat. No. 5,975,831 to Martin teaches a game hoist for mounting to the cargo rack of an all-terrain vehicle (ATV). The game hoist is mounted to the cargo rack using a base plate which has one or more sets of angle brackets mounted to the underside of the base plate. The sets of angle brackets form pockets or receptacles to slidably receive respective rods of the cargo rack. The base plate has an upward facing cylindrical post which receives a cylindrical column. A telescoping boom is provided with a cylindrical collar which fits over the top end of the column. The telescoping boom has an inner cylindrical member which is slidingly received in an outer cylindrical member. The inner cylindrical member may be telescoped outward from the outer cylindrical member. The outer end of the inner cylindrical member is provided with a manually operated winch. The winch is desirably provided with a ratchet mechanism.

A FIFTH EXAMPLE, U.S. Pat. No. 6,138,991 to Myers, Jr. teaches a hoist apparatus for a vehicle, such as an all terrain vehicle (ATV) and includes a support bracket assembly for mounting on the vehicle. The support bracket assembly includes a horizontal support plate and a hoist-axle-reception channel depending downward from the horizontal support plate. A hoist assembly is provided and is supported by the support bracket assembly. The hoist assembly includes a hoist axle received in the hoist-axle-reception channel and includes a hoist base plate supported by the horizontal support plate. Game, such as a deer, can be supported by the hoist assembly and rotated around the support bracket assembly on the hoist axle and the hoist base plate. In accordance with one embodiment of the invention, the support bracket assembly includes mounting plates for mounting on the rear of the vehicle. In accordance with another embodiment of the invention, the support bracket assembly is mounted on a side of the vehicle. In this case, the support bracket assembly includes a horizontal support plate, and a horizontally oriented bracket-to-vehicle connector is connected to the horizontal support plate. A complimentary horizontally oriented vehicle-to-bracket connector is located on the vehicle for connection with the bracket-to-vehicle connector. The horizontal support plate includes a foot-reception area for receiving a foot of a driver of the vehicle. A hoist locking arm assembly is connected to the vehicle and is used to lock the hoist assembly when not in use.

A SIXTH EXAMPLE, U.S. Pat. No. 6,155,771 to Montz teaches a load-bearing hoist to lift and load game or other objects. The hoist is particularly adapted for attachment to an ATV. The hoist includes a 360 degree rotating horizontal boom attached to a two-piece telescoping vertical shaft. The two-piece telescoping vertical shaft allows the height of the boom to be varied. The hoist is attached to the ATV by a base plate and support sleeve which allows the hoist to be supported in a vertical position and removes any weight load from the ATV. The base of the hoist can be used to carry a hunter's tree climber stand or gun case.

It is apparent that numerous innovations for ATV attachments have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

ACCORDINGLY, AN OBJECT of the present invention is to provide a multi-function winch for interchangeably attaching to one of the front of an ATV and the back of the ATV that avoids the disadvantages of the prior art.

ANOTHER OBJECT of the present invention is to provide a multi-function winch for interchangeably attaching to one of the front of an ATV and the back of the ATV that is simple to use.

BRIEFLY STATED, STILL ANOTHER OBJECT of the present invention is to provide a multi-function winch for interchangeably attaching to either the front of an ATV or the back of the ATV. The multi-function winch includes a front mounting assembly, a back mounting assembly, a column assembly, an elbow assembly, and a winch assembly. The front mounting assembly attaches to the front cargo rack of the ATV. The back mounting assembly attaches to the back cargo rack of the ATV and to the trailer hitch of the ATV. The column assembly is interchangeably attached to either the front mounting assembly or to the back mounting assembly. The elbow assembly is interchangeably attached to the front mounting assembly. The winch assembly is interchangeably attached to either the rear mounting assembly, the column assembly, or the elbow assembly.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawing are briefly described as follows:

FIG. 3A is a diagrammatic perspective view of the multi-function winch of the present invention attached to the front of the ATV and functioning as a hoist for lifting an object from behind the ATV;

FIG. 3B is a diagrammatic perspective view of the multi-function winch of the present invention attached to the front of the ATV and functioning as a hoist for lifting an object onto the ATV;

FIG. 3C is a diagrammatic perspective view of the multi-function winch of the present invention attached to the front of the ATV and functioning as a retriever for retrieving an object from behind the ATV;

FIG. 4A is a diagrammatic perspective view of the multi-function winch of the present invention attached to the back of the ATV and functioning as a hoist for lifting an object from behind the ATV;

FIG. 4B is a diagrammatic perspective view of the multi-function winch of the present invention attached to the back of the ATV and functioning as a hoist for lifting an object onto the ATV; and FIG. 4C is a diagrammatic perspective view of the multi-function winch of the present invention attached to the back of the ATV and functioning as a retriever for retrieving an object from behind the ATV.

Figure 1:
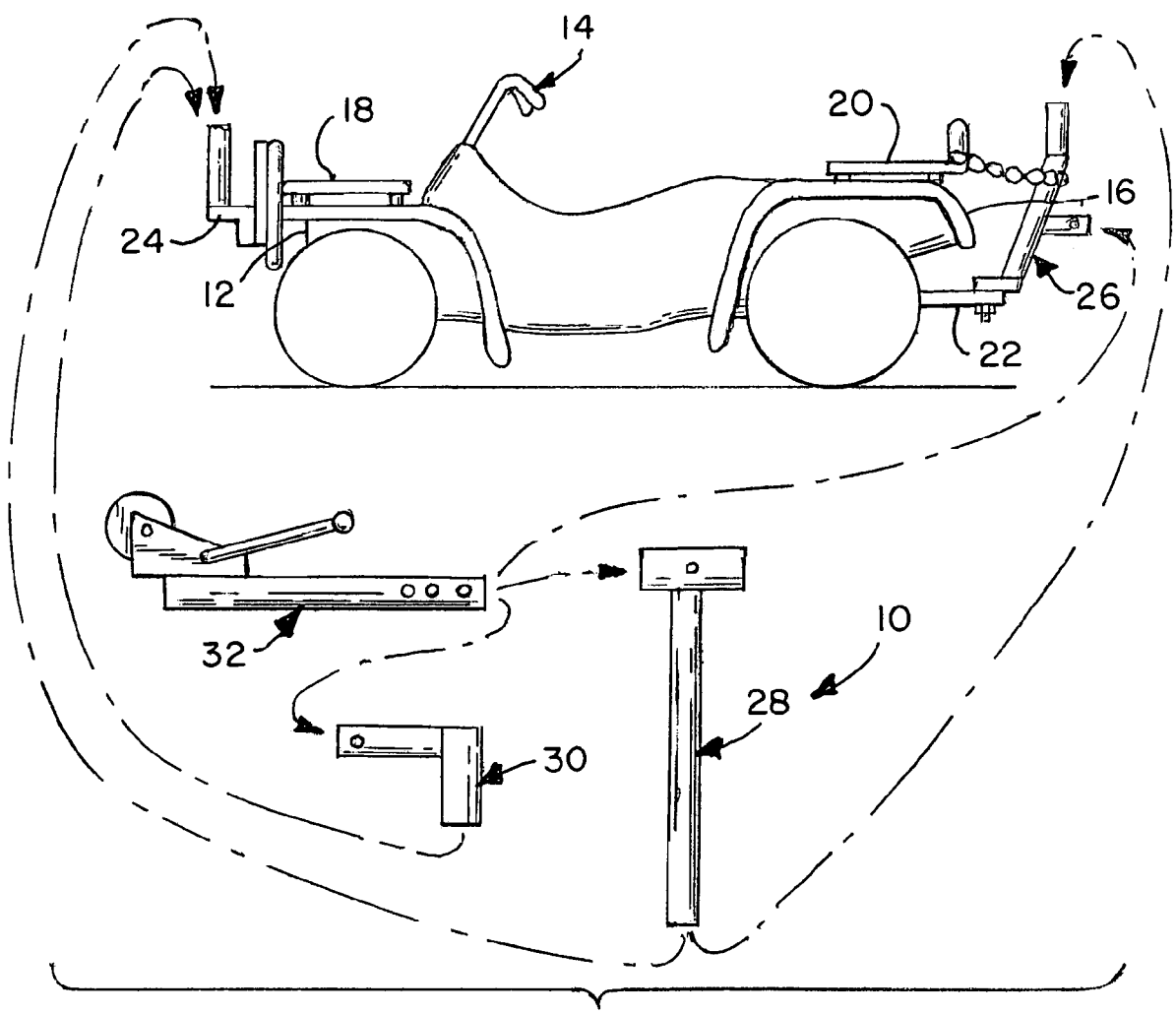
FIG. 1 is an exploded diagrammatic side elevational view of the multi-function winch of the present invention interchangeably attaching to one of the front of an ATV and the back of the ATV.

LIST OF REFERENCE NUMERALS UTILIZED IN THE DRAWING 10 multifunction winch of present invention for interchangeably attaching to one of front 12 of ATV 14 and back 16 of ATV 14
12 front of ATV 14
14 ATV -continued

LIST OF REFERENCE NUMERALS UTILIZED IN THE DRAWING 16 back of ATV 14
18 front cargo rack of ATV 14
20 back cargo rack of ATV 14
22 trailer hitch of ATV 14
24 front mounting assembly for attaching to front cargo rack 18 of ATV 14
26 back mounting assembly for attaching to back cargo rack 20 of ATV 14 and trailer hitch 22 of ATV 14
28 column assembly
30 elbow assembly
32 winch assembly
34 plate of front mounting assembly 24 for attaching to front cargo rack 18 of ATV 14
36 bottom edge of plate 34 of front mounting assembly 24
35 pair of side edges of plate 34 of front mounting assembly 24
40 top edge of plate 34 of front mounting assembly 24
41 front face of plate 34 of front mounting assembly 24
42 two pair of through bores in plate 34 of front mounting assembly 24
43 rear face of plate 34 of front mounting assembly 24
44 two U bolts of front mounting assembly 24 for capturing front cargo assembly 18 between itself and rear face 43 of plate 34 of front mounting assembly 24, thereby attaching front mounting assembly 24 to front cargo rack 18 of ATV 14
46 nuts of front mounting assembly 24
48 right angle ledge of front mounting assembly 24
50 vertical portion of right angle ledge 48 of front mounting assembly 24
52 horizontal portion of right angle ledge 46 of front mounting assembly 24
54 column of front mounting assembly 24
55 free end of column 54 of front mounting assembly 24
56 column of back mounting assembly 26 for attaching to back cargo rack 20 of ATV 14 and to trailer hitch 22 of ATV 14
56 lower end of column 56 of back mounting assembly 26
60 free upper end of column 56 of back mounting assembly 26
62 plate of back mounting assembly 26
64 terminal end of plate 62 of back mounting assembly 26
66 threaded rod of back mounting assembly 26 for entering trailer hitch 22 of ATV 14, thereby partially attaching back mounting assembly 26 to ATV 14
68 nut of back mounting assembly 26
70 pair of chains of back mounting assembly 26
71 hooks of pair of chains 70 of back mounting assembly 26 for interchangeably engaging back cargo rack 20 of ATV 14, thereby completing attaching back mounting assembly 26 to ATV 14
72 sleeve of back mounting assembly 26
74 free end of sleeve 72 of back mounting assembly 26
75 through bore in sleeve 72 of back mounting assembly 26
76 column of column assembly 28
78 upper end of column 76 of column assembly 28
80 lower end of column 76 of column assembly 28
82 sleeve of column assembly 28
83 through bore in sleeve 52 of column assembly 28
84 vertical portion of elbow assembly 30
86 horizontal portion of elbow assembly 30
87 through bore in horizontal portion 86 of elbow assembly 30
88 beam of winch assembly
90 proximal end of beam 88 of winch assembly
92 distal end of beam 88 of winch assembly
93 plurality of through bores in distal end 92 of beam 88 of winch assembly 32
94 winch of winch assembly 32
96 pin
98 object
100 ground

DETAILED DESCRIPTION OF THE PREFERRED EMBODIMENT

Referring now to the figures, in which like numerals indicate like parts, and particularly to FIG. 1, which is an exploded diagrammatic side elevational view of the multi-function winch of the present invention interchangeably attaching to one of the front of an ATV and the back of the ATV, the multi-function winch of the present invention is shown generally at 10 for interchangeably attaching to one of the front 12 of an ATV 14 and the back 16 of the ATV 14. The ATV 14 has a front cargo rack 18, a back cargo rack 20, and a trailer hitch 22.

The multi-function winch 10 comprises a front mounting assembly 24, a back mounting assembly 26, a column assembly 28, an elbow assembly 30, and a winch assembly 32. The front mounting assembly 24 is for attaching to the front cargo rack 18 of the ATV 14. The back mounting assembly 26 is for attaching to the back cargo rack 20 of the ATV 14 and the trailer hitch 22 of the ATV 14. The column assembly 28 is interchangeably attached to one of the front mounting assembly 24 and the back mounting assembly 26. The elbow assembly 30 is interchangeably attached to the front mounting assembly 24. The winch assembly 32 is interchangeably attached to one of the rear mounting assembly 26, the column assembly 28, and the elbow assembly 30.

Figure 2:
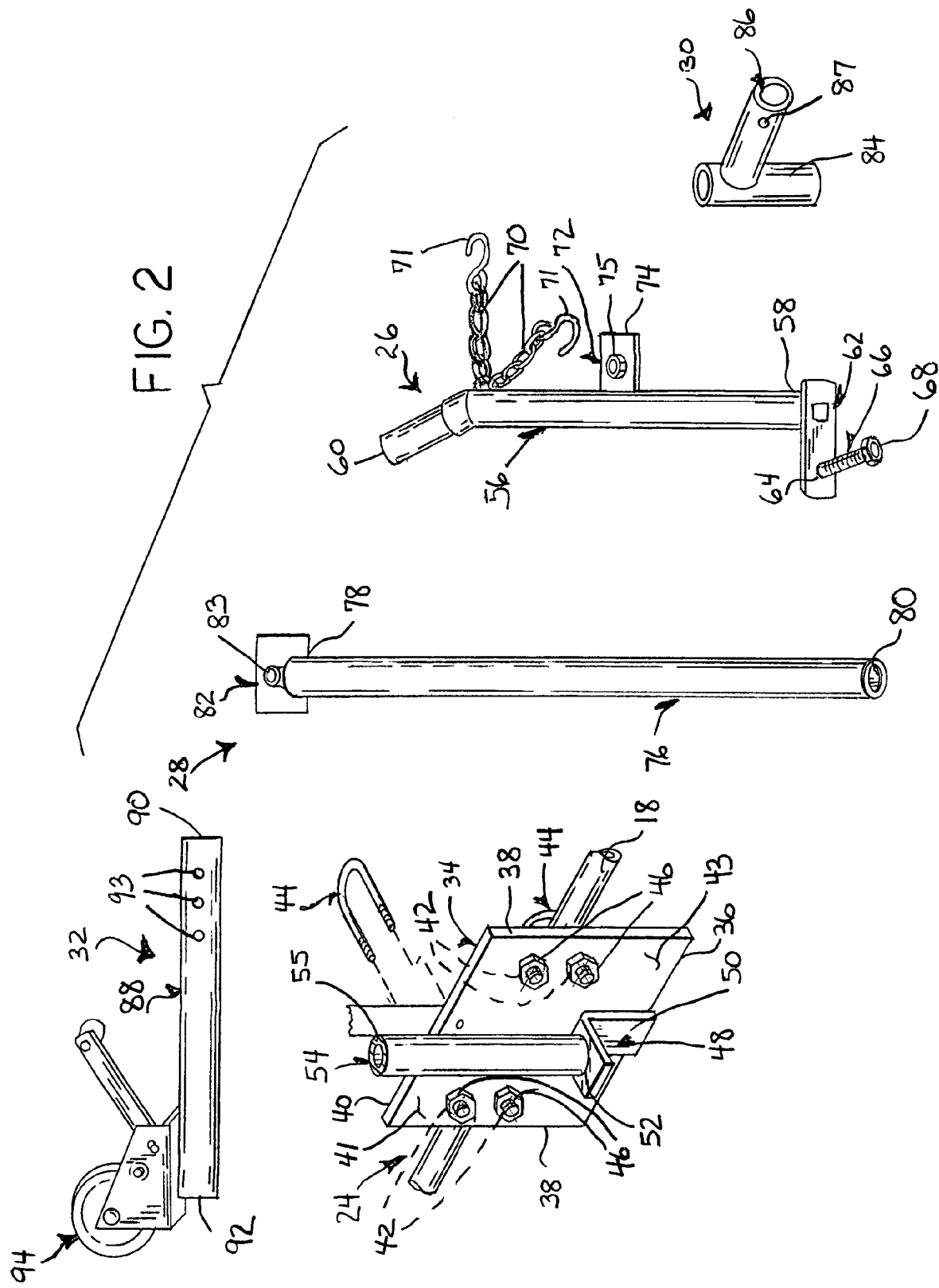
FIG. 2 is a diagrammatic perspective view of the components of the multi-function winch of the present invention.

The specific configuration of the front mounting assembly 24, the back mounting assembly 26, the column assembly 28, the elbow assembly 30, and the winch assembly 32 can best be seen in FIG. 2, which is a diagrammatic perspective view of the components of the multi-function winch of the present invention, and as such, will be discussed with reference thereto.

The front mounting assembly 24 comprises a plate 34. The plate 34 of the front mounting assembly 24 is for attaching to the front cargo rack 18 of the ATV 14, and has a height that does not obstruct view when operating the ATV 14.

The plate 34 of the front mounting assembly 24 has a bottom edge 36, a pair of side edges 38, a top edge 40, a front face 41, and a rear face 43.

The plate 34 of the front mounting assembly 24 has two pair of through bores 42 therethrough. The two pair of through bores 42 are disposed just inwardly of the pair of side edges 38 of the plate 34 of the front mounting assembly 24, respectively.

Each pair of through bores 42 in the plate 34 of the front mounting assembly 24 are vertically-aligned and vertically spaced-apart from each other.

The front mounting assembly 24 further comprises two U bolts 44. The two U bolts 44 of the front mounting assembly 24 extend into the two pair of through bores 42 in the plate 34 of the front mounting assembly 24, respectively, from the rear face 43 of the plate 34 of the front mounting assembly 24, engage nuts 46 thereafter on the front face 41 of the plate 34 of the front mounting assembly 24, and are for capturing the front cargo assembly 18 of the ATV 14 between itself and the rear face 43 of the plate 34 of the front mounting assembly 24, thereby attaching the front mounting assembly 24 to the front cargo rack 18 of the ATV 14.

The front mounting assembly 24 further comprises a right angle ledge 48. The right angle ledge 48 of the front mounting assembly 24 has a vertical portion 50 and a horizontal portion 52.

The vertical portion 50 of the right angle ledge 48 of the front mounting assembly 24 is attached to the front face 41 of the plate 34 of the front mounting assembly 24, adjacent the bottom edge 36 of the plate 34 of the front mounting assembly 24, and substantially equidistant between the pair of side edges 38 of the plate 34 of the front mounting assembly 24.

The horizontal portion 52 of the right angle ledge 48 of the front mounting assembly 24 extends outwardly from the vertical portion 50 of the right angle ledge 48 of the front mounting assembly 24, farthest away from the bottom edge 36 of the plate 34 of the front mounting assembly 24.

The front mounting assembly 24 further comprises a column 54. The column 54 of the front mounting assembly 24 is preferably a slender tube and extends vertically upwardly from the horizontal portion 52 of the right angle ledge 48 of the front mounting assembly 24, to a free end 55 that is just past the top edge 40 of the plate 34 of the front mounting assembly 24.

The back mounting assembly 26 comprises a column 56. The column 56 of the back mounting assembly 26 is preferably an elongated and slender tube and is for attaching to the back cargo rack 20 of the ATV 14 and to the trailer hitch 22 of the ATV 14.

The column 56 of the back mounting assembly 26 has a lower end 58 and a free upper end 60.

The free upper end 60 of the column 56 of the back mounting assembly 26 bends forwardly for allowing a remainder of the column 56 of the back mounting assembly 26 to clear the back 16 of the ATV 14, while the free upper end 60 of the column 56 of the back mounting assembly 26 remains substantially vertical.

The back mounting assembly 26 further comprises a plate 62. The plate 62 of the back mounting assembly 26 extends forwardly from the lower end 58 of the column 56 of the back mounting assembly 26, to a terminal end 64.

The plate 62 of the back mounting assembly 26 bends downwardly from the lower end 58 of the column 56 of the back mounting assembly 26 for allowing the plate 62 of the back mounting assembly 26 to remain substantially horizontal and abut the trailer hitch 22 of the ATV 14, while the remainder of the column 56 of the back mounting assembly 26 clears the back 16 of the ATV 14.

The back mounting assembly 26 further comprises a threaded rod 66. The threaded rod 66 of the back mounting assembly 26 depends from the terminal end 64 of the plate 62 of the back mounting assembly 26 and engages a nut 68, after entering the trailer hitch 22 of the ATV 14, thereby partially attaching the back mounting assembly 26 to the ATV 14.

The back mounting assembly 26 further comprises a pair of chains 70 terminating in hooks 71. The pair of chains 70 of the back mounting assembly 26 extend from where the free upper end 60 of the column 56 of the back mounting assembly 26 begins to bend and are for having the hooks 71 thereof interchangeably engaging the back cargo rack 20 of the ATV 14, thereby completing the attaching of the back mounting assembly 26 to the ATV 14.

The back mounting assembly 26 further comprises a sleeve 72. The sleeve 72 of the back mounting assembly 26 is preferably tubular and extends rearwardly from the column 56 of the back mounting assembly 26, intermediate the lower end 58 of the column 56 of the back mounting assembly 26 and the free upper end 60 of the column 56 of the back mounting assembly 26, to a free end 74.

The sleeve 72 of the back mounting assembly 26 has a through bore 75 therethrough. The through bore 75 extends laterally through the sleeve 72 of the back mounting assembly 26.

The column assembly 28 comprises a column 76. The column 76 of the column assembly 28 is preferably tubular, is slender and elongated, and has an upper end 78 and a lower end 80.

The column assembly 28 further comprises a sleeve 82. The sleeve 82 of the column assembly 28 is preferably a slender tube and extends transversely and preferably equidistantly from the upper end 78 of the column 76 of the column assembly 28 to form a generally T-shape configuration therewith.

The sleeve 82 of the column assembly 28 has a through bore 83. The through bore 83 extends laterally through the sleeve 82 of the column assembly 28.

The elbow assembly 30 has a vertical portion 84, which is preferably slender and tubular, and a horizontal portion 86, which is preferably slender and tubular.

The horizontal portion 86 of the elbow assembly 30 has a through bore 87 therethrough. The through bore 87 extends laterally through the horizontal portion 86 of the elbow assembly 30.

The winch assembly 32 comprises a beam 88. The beam 88 of the winch assembly 32 is preferably tubular, is slender and elongated, and has a proximal end 90 and a distal end 92.

The beam 88 of the winch assembly 32 has a plurality of through bores 93 therethrough. The plurality of through bores 93 extend laterally through, and are longitudinally spaced-apart along, the proximal end 90 of the beam 88 of the winch assembly 32.

The winch assembly 32 further comprises a winch 94. The winch 94 of the winch assembly 32 is attached to the distal end 92 of the beam 88 of the winch assembly 32.

The configurations by which the multi-function winch 10 can be interchangeably attached to the front 12 of the ATV 14 can best be seen in FIGS. 3A-3C, which are, respectively, a diagrammatic perspective view of the multi-function winch of the present invention attached to the front of the ATV and functioning as a hoist for lifting an object from behind the ATV, a diagrammatic perspective view of the multi-function winch of the present invention attached to the front of the ATV and functioning as a hoist for lifting an object onto the ATV, and a diagrammatic perspective view of the multi-function winch of the present invention attached to the front of the ATV and functioning as a retriever for retrieving an object from behind the ATV, and as such, will be discussed with reference thereto.

As shown in FIGS. 3A and 3B generally, the lower end 80 of the column 76 of the column assembly 28 rotatably receives the column 54 of the front mounting assembly 24, the sleeve 82 of the column assembly 28 slidably receives the beam 88 of the winch assembly 32, with the winch 94 of the winch assembly 32 oriented downwardly, and a pin 96 enters the through bore 83 in the sleeve 82 of the column assembly 28 and an appropriate one of the plurality of through bores 93 in the beam 88 of the winch assembly 32 to maintain the beam 88 of the winch assembly 32 at a selected position in the sleeve 82 of the column assembly 28.

As shown in FIG. 3A specifically, the column 76 of the column assembly 28 is rotated so as to allow the winch 94 of the winch assembly 32 to be positioned on a side of the column 76 of the column assembly 28 that is opposite to that of the plate 34 of the front mounting assembly 24 for allowing the winch 94 of the winch assembly 32 to hoist an object 98 that is in front of the ATV 14.

As shown in FIG. 3B specifically, the column 76 of the column assembly 28 is rotated so as to allow the winch 94 of the winch assembly 32 to be positioned on a side of the column 76 of the column assembly 28 that the plate 34 of the front mounting assembly 24 is on for allowing the winch 94 of the winch assembly 32 to lower the object 98 onto the front cargo rack 18 of the ATV 14.

As shown in FIG. 3C, the vertical portion 84 of the elbow assembly 30 rotatably receives the column 54 of the front mounting assembly 24, with the elbow assembly 30 so rotated so as to allow the horizontal portion 86 of the elbow assembly 30 to be positioned on a side of the vertical portion 84 of the elbow assembly 30 that is opposite to that of the plate 34 of the front mounting assembly 24, the horizontal portion 86 of the elbow assembly 30 is slidably received by the proximal end 90 of the beam 88 of the winch assembly 32, with the winch 94 of the winch assembly 32 oriented upwardly, and the pin 96 enters an appropriate one of the plurality of through bores 93 in the beam 88 of the winch assembly 32 and the through bore 87 in the horizontal portion 86 of the elbow assembly 30 to maintain the horizontal portion 86 of the elbow assembly 30 at a selected position in the beam 88 of the winch assembly 32 for allowing the winch 94 of the winch assembly 32 to retrieve the object 98 that is on the ground 100 forward of the ATV 14.

The configurations by which the multi-function winch 10 can be interchangeably attached to the back 16 of the ATV 14 can best be seen in FIGS. 4A-4C, which are, respectively, a diagrammatic perspective view of the multi-function winch of the present invention attached to the back of the ATV and functioning as a hoist for lifting an object from behind the ATV, a diagrammatic perspective view of the multi-function winch of the present invention attached to the back of the ATV and functioning as a hoist for lifting an object onto the ATV, and a diagrammatic perspective view of the multi-function winch of the present invention attached to the back of the ATV and functioning as a retriever for retrieving an object from behind the ATV, and as such, will be discussed with reference thereto.

As shown in FIGS. 4A and 4B generally, the lower end 80 of the column 76 of the column assembly 28 rotatably receives the upper end 60 of the column 56 of the back mounting assembly 26, the sleeve 82 of the column assembly 28 slidably receives the beam 88 of the winch assembly 32, with the winch 94 of the winch assembly 32 oriented downwardly, and the pin 96 enters the through bore 83 in the sleeve 82 of the column assembly 28 and an appropriate one of the plurality of through bores 93 in the beam 88 of the winch assembly 32 to maintain the beam 88 of the winch assembly 32 at a selected position in the sleeve 82 of the column assembly 28.

As shown in FIG. 4A specifically, the column 76 of the column assembly 28 is rotated so as to allow the winch 94 of the winch assembly 32 to be positioned on a side of the column 76 of the column assembly 28 that the sleeve 72 of the back mounting assembly 26 is on for allowing the winch 94 of the winch assembly 32 to hoist the object 98 that is rearward of the ATV 14.

As shown in FIG. 4B specifically, the column 76 of the column assembly 28 is rotated so as to allow the winch 94 of the winch assembly 32 to be positioned on a side of the column 76 of the column assembly 28 that is opposite to that of the sleeve 72 of the back mounting assembly 26 for allowing the winch 94 of the winch assembly 32 to lower the object 98 onto the back cargo rack 20 of the ATV 14.

As shown in FIG. 4C, the sleeve 72 of the back mounting assembly 26 is received by the proximal end 90 of the beam 88 of the winch assembly 32, with the winch 94 of the winch assembly 32 oriented upwardly, and the pin 96 enters an appropriate one of the plurality of through bores 93 in the beam 88 of the winch assembly 32 and the through bore 75 in the sleeve 72 of the back mounting assembly 26 to maintain the sleeve 72 of the back mounting assembly 26 in the beam 88 of the winch assembly 32 for allowing the winch 94 of the winch assembly 32 to retrieve the object 98 that is on the ground 100 rearward of the ATV 14.

It will be understood that each of the elements described above, or two or more together, may also find a useful application in other types of constructions differing from the types described above.

While the invention has been illustrated and described as embodied in a multi-function winch for interchangeably attaching to one of the front of an ATV and the back of the ATV, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A multi-function winch for interchangeably attaching to one of the front of an ATV and the back of the ATV, wherein the ATV has a front cargo rack, a back cargo rack, and a trailer hitch, said multi-function winch comprising:
   a) a front mounting assembly;
   b) a back mounting assembly;
   c) a column assembly;
   d) an elbow assembly; and
   e) a winch assembly;
   wherein said front mounting assembly is for attaching to the front cargo rack of the ATV;
   wherein said back mounting assembly is for attaching to the back cargo rack of the ATV concurrent with attachment to the trailer hitch of the ATV;
   wherein said column assembly is interchangeably attached to one of said front mounting assembly and said back mounting assembly;
   wherein said elbow assembly is interchangeably attached to said front mounting assembly;
   wherein said winch assembly is interchangeably attached to one of said rear mounting assembly, said column assembly, and said elbow assembly;
   wherein said front mounting assembly comprises a plate;
   wherein said plate of said front mounting assembly has a bottom edge;
   wherein said plate of said front mounting assembly has a pair of side edges;
   wherein said plate of said front mounting assembly has a top edge;
   wherein said plate of said front mounting assembly has a front face;
   wherein said plate of said front mounting assembly has a rear face;
   wherein said front mounting assembly comprises a right angle ledge;
   wherein said right angle ledge of said front mounting assembly has a vertical portion;
   wherein said right angle ledge of said front mounting assembly has a horizontal portion;
   wherein said front mounting assembly comprises a column;
   wherein said back mounting assembly comprises a column;
   wherein said column of said back mounting assembly is for attaching to the back cargo rack of the ATV;
   wherein said column of said back mounting assembly is also for attaching to the trailer hitch of the ATV;
   wherein said column of said back mounting assembly has a lower end;
   wherein said column of said back mounting assembly has a free upper end;
   wherein said back mounting assembly comprises a plate;
   wherein said plate of said back mounting assembly extends forwardly from said lower end of said column of said back mounting assembly, to a terminal end;
   wherein said threaded rod of said back mounting assembly depends from said terminal end of said plate of said back mounting assembly and engages a nut, after entering the trailer hitch of the ATV, thereby partially attaching said back mounting assembly to the ATV;
   wherein said back mounting assembly comprises a pair of chains; and
   wherein said pair of chains of said back mounting assembly terminate in hooks, respectively.

2. The multi-function winch as defined in claim 1, wherein said plate of said front mounting assembly has two pair of through bores therethrough.

3. The multi-function winch as defined in claim 2, wherein said two pair of through bores are disposed just inwardly of said pair of side edges of said plate of said front mounting assembly, respectively.

4. The multi-function winch as defined in claim 2, wherein each pair of through bores in said plate of said front mounting assembly are vertically-aligned with each other; and
   wherein each pair of through bores in said plate of said front mounting assembly are vertically spaced-apart from each other.

5. The multi-function winch as defined in claim 2, wherein said front mounting assembly comprises two U bolts.

6. The multi-function winch as defined in claim 5, wherein said two U bolts of said front mounting assembly extend into said two pair of through bores in said plate of said front mounting assembly, respectively, from said rear face of said plate of said front mounting assembly, engage nuts thereafter on said front face of said plate of said front mounting assembly, and are for capturing the front cargo assembly of the ATV between itself and said rear face of said plate of said front mounting assembly, thereby attaching said front mounting assembly to the front cargo rack of the ATV.

7. The multi-function winch as defined in claim 1, wherein said vertical portion of said right angle ledge of said front mounting assembly is attached to said front face of said plate of said front mounting assembly.

8. The multi-function winch as defined in claim 1, wherein said vertical portion of said right angle ledge of said front mounting assembly is adjacent said bottom edge of said plate of said front mounting assembly.

9. The multi-function winch as defined in claim 1, wherein said vertical portion of said right angle ledge of said front mounting assembly is substantially equidistant between said pair of side edges of said plate of said front mounting assembly.

10. The multi-function winch as defined in claim 1, wherein said horizontal portion of said right angle ledge of said front mounting assembly extends outwardly from said vertical portion of said right angle ledge of said front mounting assembly, at a place thereon farthest away from said bottom edge of said plate of said front mounting assembly.

11. The multi-function winch as defined in claim 1, wherein said column of said front mounting assembly extends vertically upwardly from said horizontal portion of said right angle ledge of said front mounting assembly, to a free end.

12. The multi-function winch as defined in claim 11, wherein said free end of column of said front mounting assembly is just past said top edge of said plate of said front mounting assembly.

13. The multi-function winch as defined in claim 1, wherein said column of said back mounting assembly is a tube.

14. The multi-function winch as defined in claim 13, wherein said tube of said column of said back mounting assembly is elongated.

15. The multi-function winch as defined in claim 1, wherein said free upper end of said column of said back mounting assembly bends forwardly for allowing a remainder of said column of said back mounting assembly to clear the back of the ATV, while said free upper end of said column of said back mounting assembly remains substantially vertical.

16. The multi-function winch as defined in claim 1, wherein said plate of said back mounting assembly bends downwardly from said lower end of said column of said back mounting assembly for allowing said plate of said back mounting assembly to remain substantially horizontal and abut the trailer hitch of the ATV, while a remainder of said column of said back mounting assembly clears the back of the ATV.

17. The multi-function winch as defined in claim 1 wherein said back mounting assembly comprises a threaded rod.

18. The multi-function winch as defined in claim 1, wherein said pair of chains of said back mounting assembly extend from where said free upper end of said column of said back mounting assembly begins to bend; and wherein said hooks of said pair of chains of said back mounting assembly are for engaging the back cargo rack of the ATV, thereby completing attaching said back mounting assembly to the ATV.

19. The multi-function winch as defined in claim 1, wherein said back mounting assembly comprises a sleeve.

20. The multi-function winch as defined in claim 19, wherein said sleeve of said back mounting assembly is tubular.

21. The multi-function winch as defined in claim 19, wherein said sleeve of said back mounting assembly extends rearwardly from said column of said back mounting assembly, to a free end.

22. The multi-function winch as defined in claim 19, wherein said sleeve of said back mounting assembly is intermediate said lower end of said column of said back mounting assembly and said free upper end of said column of said back mounting assembly.

23. The multi-function winch as defined in claim 19, wherein said sleeve of said back mounting assembly has a through bore therethrough.

24. The multi-function winch as defined in claim 23, wherein said through bore in said sleeve of said back mounting assembly extends laterally through said sleeve of said back mounting assembly.

25. The multi-function winch as defined in claim 23, wherein said column assembly comprises a column.

26. The multi-function winch as defined in claim 25, wherein said column of said column assembly is tubular; and
   wherein said column of said column assembly is elongated.

27. The multi-function winch as defined in claim 25, wherein said column of said column assembly has an upper end; and
   wherein said column of said column assembly has a lower end.

28. The multi-function winch as defined in claim 27, wherein said column assembly comprises a sleeve.

29. The multi-function winch as defined in claim 28, wherein said sleeve of said column assembly is tubular.

30. The multi-function winch as defined in claim 28, wherein said sleeve of said column assembly extends transversely from said upper end of said column of said column assembly to form a generally T-shape configuration therewith.

31. The multi-function winch as defined in claim 28, wherein said sleeve of said column assembly extends equidistantly transversely from said upper end of said column of said column assembly to form a generally T-shape configuration therewith.

32. The multi-function winch as defined in claim 28, wherein said sleeve of said column assembly has a through bore.

33. The multi-function winch as defined in claim 32, wherein said through bore extends laterally through said sleeve of said column assembly.

34. The multi-function winch as defined in claim 32, wherein said elbow assembly has a vertical portion; and
   wherein said elbow assembly has a horizontal portion.

35. The multi-function winch as defined in claim 34, wherein said vertical portion of said elbow assembly is tubular;
   wherein said horizontal portion of said elbow assembly is tubular.

36. The multi-function winch as defined in claim 34, wherein said horizontal portion of said elbow assembly has a through bore therethrough.

37. The multi-function winch as defined in claim 36, wherein said through bore in said horizontal portion of said elbow assembly extends laterally through said horizontal portion of said elbow assembly.

38. The multi-function winch as defined in claim 36, wherein said winch assembly comprises a beam.

39. The multi-function winch as defined in claim 38, wherein said beam of said winch assembly is tubular, and
   wherein said beam of said winch assembly is elongated.

40. The multi-function winch as defined in claim 38, wherein said beam of said winch assembly has a proximal end; and
   wherein said beam of said winch assembly has a distal end.

41. The multi-function winch as defined in claim 40, wherein said beam of said winch assembly has a plurality of through bores therethrough.

42. The multi-function winch as defined in claim 41, wherein said plurality of through bores extend laterally through said proximal end of said beam of said winch assembly; and
   wherein said plurality of through bores are longitudinally spaced-apart along said proximal end of said beam of said winch assembly.

43. The multi-function winch as defined in claim 41, wherein said winch assembly comprises a winch.

44. The multi-function winch as defined in claim 43, wherein said winch of said winch assembly is attached to said distal end of said beam of said winch assembly.

45. The multi-function winch as defined in claim 43, wherein said lower end of said column of said column assembly rotatably receives said column of said front mounting assembly;
- wherein said sleeve of said column assembly slidably receives said beam of said winch assembly;
- wherein said winch of said winch assembly is oriented downwardly; and
- wherein a pin enters said through bore in said sleeve of said column assembly and an appropriate one of said plurality of through bores in said beam of said winch assembly to maintain said beam of said winch assembly at a selected position in said sleeve of said column assembly.

46. The multi-function winch as defined in claim 45, wherein said column of said column assembly is capable of rotation to position said winch of said winch assembly on a side of said column of said column assembly that is opposite to that of said plate of said front mounting assembly for allowing said winch of said winch assembly to hoist an object that is in front of the ATV.

47. The multi-function winch as defined in claim 45, wherein said column of said column assembly is capable of rotation to position said winch of said winch assembly on a side of said column of said column assembly that said plate of said front mounting assembly is on for allowing said winch of said winch assembly to lower an object onto the front cargo rack of the ATV.

48. The multi-function winch as defined in claim 43, wherein said vertical portion of said elbow assembly rotatably receives said column of said front mounting assembly;
- wherein said elbow assembly is capable of rotation to position said horizontal portion of said elbow assembly on a side of said vertical portion of said elbow assembly that is opposite to that of said plate of said front mounting assembly;
- wherein said horizontal portion of said elbow assembly is slidably received by said proximal end of said beam of said winch assembly;
- wherein said winch of said winch assembly is oriented upwardly; and
- wherein a pin enters an appropriate one of said plurality of through bores in said beam of said winch assembly and said through bore in said horizontal portion of said elbow assembly to maintain said horizontal portion of said elbow assembly at a selected position in said beam of said winch assembly for allowing said winch of said winch assembly to retrieve an object that is on the ground forward of the ATV.

49. The multi-function winch as defined in claim 43, wherein said lower end of said column of said column assembly rotatably receives said upper end of said column of said back mounting assembly;
- wherein said sleeve of said column assembly slidably receives said beam of said winch assembly;
- wherein said winch of said winch assembly is oriented downwardly; and
- wherein a pin enters said through bore in said sleeve of said column assembly and an appropriate one of said plurality of through bores in said beam of said winch assembly to maintain said beam of said winch assembly at a selected position in said sleeve of said column assembly.

50. The multi-function winch as defined in claim 49, wherein said column of said column assembly is capable of rotation to position said winch of said winch assembly on a side of said column of said column assembly that said sleeve of said back mounting assembly is on for allowing said winch of said winch assembly to hoist an object that is rearward of the ATV.

51. The multi-function winch as defined in claim 49, wherein said column of said column assembly is capable of rotation to position said winch of said winch assembly on a side of said column of said column assembly that is opposite to that of said sleeve of said back mounting assembly for allowing said winch of said winch assembly to lower an object onto the back cargo rack of the ATV.

52. The multi-function winch as defined in claim 43, wherein said sleeve of said back mounting assembly is received by said proximal end of said beam of said winch assembly;
- wherein said winch of said winch assembly is oriented upwardly; and
- wherein a pin enters an appropriate one of said plurality of through bores in said beam of said winch assembly and said through bore in said sleeve of said back mounting assembly to maintain said sleeve of said back mounting assembly in said beam of said winch assembly for allowing said winch of said winch assembly to retrieve an object that is on the ground rearward of the ATV.

* * * * *